US007287214B1

(12) United States Patent
Jenkins et al.

(10) Patent No.: US 7,287,214 B1
(45) Date of Patent: Oct. 23, 2007

(54) SYSTEM AND METHOD FOR PROVIDING A SEARCHABLE LIBRARY OF ELECTRONIC DOCUMENTS TO A USER

(75) Inventors: Douglas M. Jenkins, Groveland, MA (US); Geoff Chappell, Windsor, VT (US); John Sidlo, Brookline, MA (US); Bill Roberts, Medway, MA (US); Steven Smith, Lowell, MA (US); Richard LaFauci, New York, NY (US)

(73) Assignee: Books24x7.com, Inc., Norwood, MA (US)

( * ) Notice: Subject to any disclaimer, the term of this patent is extended or adjusted under 35 U.S.C. 154(b) by 696 days.

(21) Appl. No.: 09/734,494

(22) Filed: Dec. 11, 2000

Related U.S. Application Data

(60) Provisional application No. 60/170,038, filed on Dec. 10, 1999.

(51) Int. Cl.
*G06F 15/00* (2006.01)
*G06F 17/00* (2006.01)

(52) U.S. Cl. ............... 715/500; 715/513; 715/530; 707/6

(58) Field of Classification Search ............ 715/500, 715/513, 530; 707/6
See application file for complete search history.

(56) References Cited

U.S. PATENT DOCUMENTS

| | | | | |
|---|---|---|---|---|
| 5,778,366 | A | * | 7/1998 | Gillihan et al. ............ 707/9 |
| 5,850,520 | A | * | 12/1998 | Griebenow et al. ........ 709/206 |
| 5,893,132 | A | | 4/1999 | Huffman et al. |
| 5,907,845 | A | | 5/1999 | Cox et al. |
| 6,101,503 | A | * | 8/2000 | Cooper et al. .......... 707/104.1 |
| 6,138,129 | A | * | 10/2000 | Combs .................... 707/6 |
| 6,292,796 | B1 | * | 9/2001 | Drucker et al. ............. 707/5 |
| 6,385,614 | B1 | * | 5/2002 | Vellandi .................... 707/9 |
| 6,493,702 | B1 | * | 12/2002 | Adar et al. ................. 707/3 |
| 6,535,791 | B1 | * | 3/2003 | Wang ..................... 700/235 |
| 6,546,406 | B1 | * | 4/2003 | DeRose et al. ........... 715/513 |
| 6,704,733 | B2 | * | 3/2004 | Clark et al. ............... 707/10 |
| 6,728,752 | B1 | * | 4/2004 | Chen et al. .............. 709/203 |

OTHER PUBLICATIONS

IEEE—Online Periodicals and Research Area, [http://web.archive.org/web/19990421185154/www.opera.ieee.org/] published online Apr. 21, 1999, pp. 1-2.*

* cited by examiner

*Primary Examiner*—William Bashore
(74) *Attorney, Agent, or Firm*—Nutter, McClennen & Fish, LLP

(57) ABSTRACT

A method and system for publishing a plurality of books for user access includes selecting a plurality of books, converting each book from a layout or publication digital data form, by providing and applying a tool to detect characteristic features (such as layout, typeface, and hierarchical or organizational features such as chapter headings, captions, drawings and tables), and extracting text or data information of the book tagged with the features. This produces a searchable publishing database indexed by book structure such that a user may remotely, access the database, search desired text data, and view an image of a portion of the book with the desired data. A search engine may score search results based on their position in the hierarchy or other factors, determining degree of relevance of text or data information located by the search engine.

17 Claims, 22 Drawing Sheets

FIG. 4

| Find Book | My Bookshelf | Login | Register | Help | Feedback |

Find Books
About Books24x7.com
Home
Free trial
Company Information

Recently Added Titles

☐ Microsoft Outlook 2000: No Experience Required, by Cynthia Randall (December 9).

☐ Microsoft Front Page 2000: No Experience Required, by Gene Weiskopf (December 9).

☐ Word 2000: No Experience Required, by Guy Hart-Davis (December 9).

More...

Publishing Partners

SYBEX
SAMS
Computing McGraw-Hill
WILEY
nolo.com LAW FOR ALL
PRAC
AH
O'REILLY
OSBORNE
The MIT Press
QUE
dp Digital Press
Waveside Publishing Want to become a Publishing Partner?

books24x7.com

Where IT Pros Go for Answers

LAST WEEK'S HOTTEST BOOK:
[XML] View the list of top 10 books.

Welcome to the Web's most authoritative information resource for technology professionals who want to work smarter, all the time.

Search, browse, and view the full contents of hundreds of top technical and computer books from trusted publishers.

No advertisements, no teaser content - just authoritative information.

Find books now, learn more, or check out what's new!

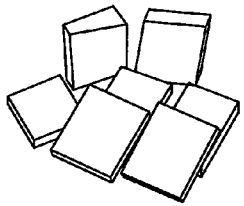

---

WHAT'S NEW.

ZD Education, Books24x7.com Enter Exclusive Partnership to Combine Computer Training Site with Expert Technical Reference Library Online Training Industry Standard Raised by Addition of World-Class IT Content Library Tech Professionals Reclaim 17.5 Hours/month with powerful new WEB SERVICE Providing the Full Content of Industry's Top Reference Works,In Searchable Format, Creates Immediate ROI HEWLETT-Packard Selects Books24x7.com. 'FORTUNE 20' Customer Attracted to Books24x7.com's Advanced Searching Capabilities to Provide Quick, Reliable Answers TRUSTe Privacy Program Provides Seal of Approval to Books24x7.com Mass High Tech Spotlights Books24x7.com. Books24x7 Puts IT books on the Web Books24x7.com Takes IT Industry by Storm With High Profile Customers, Publishers and Web Partners. Intuit, 3Com Among Impressive Companies to Subscribe to Unique Online Technical Reference Service that Gives IT Professionals the Competitive Edge.

WE'RE PLEASED TO ANNOUNCE our newest publishing partners:

Books24x7.com Signs Digital Press, Prima, Nolo and Waveside to Growing List of Content Partners, Broad Industry Support Establishes Books24x7.com, As Web's Leading IT Information Service McGraw-Hill Expands Commitment to Providing Market-Leading Professional Content to Books24x7.com. Computing McGraw-Hill Signs Content Licensing Agreement to Reach IT Professionals via Web

~50

LOGIN STATUS

| Login |
|---|
| Username: [_____] —60 |
| Password: [_____] —62 |
| 64— [Login] |
| By logging on you agree to the terms of Books24x7.com's Membership Agreement |

—58

Forgotten your login information?

If your preferences are set for automatic login, just click here to log in now

Books24x7.com, Inc© 1999 - Feedback

FIG. 8

FIG. 9 books24x7.com
[FEEDBACK]

| Search the Book Contents |
Enter words or phrases that
might occur in the text. Tips ⊙ Search All Books  (Search)
○ Search only Books on this Topic Look Up Books You Know
Enter title words, author's
name, publisher or ISBN
Tips (Lookup)

🔍 FIND BOOKS

▽ Topic: Databases
   ☐ Access ⟋ 114
   ☐ Data Mining
   ☐ Data Warehousing
   ☐ Database Design
   ☐ Database Management
   ☐ Oracle
   ☐ SQL Or See
   ▷ Enterprise Computing ⎫
   ▷ Programming        ⎬ 112
   ▷ Web Development   ⎭

─ 108

┌─ 110
(↵ Return to Main Topic List)

Books24x7.com, Inc © 1999 - Feedback

FIG. 10

◯ FIND BOOKS  (⎯ Return to Main Topic List)

Topic: Databases-Access    6 books found    ← 116

Access 2000 VBA Handbook
by Susann Novalis    ISBN:0782123244
Sybex © 1999,845 pages
An intermediate level guide to enhancing an
Access 2000 database with VBA programming.

Access 2000: The Complete Reference
by: Virginia Andersen    ISBN:0078825121
Osborne/McGraw-Hill © 1999, 1300 pages
Delivers its information quickly and cleanly.
despite its massive size

Access 97 Developer's Handbook
by Paul Litwin, Ken Getz and    ISBN:0782119417
Mike Gilbert
Sybex © 1997,1546 pages
This guide is a great complement to the Access
97 documentation from Microsoft.

Access 97 Macro & VBA Handbook
by Susann Novalis    ISBN:0782119778
Sybex © 1997, 1074 pages
Access 97 users can take their skills to expert
level with this tutorial on Access macro and VBA
programming.

Mastering Access 97 for Windows 95/NT
by Alan Simpson and Elizabeth    ISBN:0782119247
Olson
Sybex © 1997, 1140 pages
Delve fully info Access with user-focused
guide

Office 2000: The Complete Reference
by: Stephen L. Nelson    ISBN:0072118598
Osborne/McGraw-Hill © 1999, 1040 pages
This guide hits all the high points of using Office
2000.

Books24x7.com, Inc© 1999 - Feedback

--- books24x7.com
[FEEDBACK]

Search the Book Contents
Enter words or phrases that
might occur in the text. Tips

[          ]

⦿ Search All Books   ( Search )
◯ Search only Books on this Topic

Topic List

▽ Databases
→☐ Access
  ☐ Data Mining
  ☐ Data Warehousing
  ☐ Database Design
  ☐ Database Management
  ☐ Oracle
  ☐ SQL

FIG. 11A books24x7.com
[FEEDBACK]

Search the Book Contents
Enter words or phrases that might occur in the text. Tips

|java jar files

◉ Search All Books (Search)
◯ Search only Books on this List

Look Up Books You Know
Enter title words, author's name, publisher's or ISBN
Tips

[             ]
(Lookup)

🔍 SEARCH RESULTS

21 Books found for   java jar files
search

Books 1-10(of 21)    Next 10

Search relevance: high

| Java 2 |

Mastering Java 2
by John Zukowski     ISBN:0782121802
Sybex © 1998,1244 pages
Do Java right with practical instruction and tips for everything from basic to advanced features Top Section Hits (of 7 in this book) ╱ 128
- Minimizing Applet Loading Times
- Using the Java Development Kit (JDK) ╲ 130
126 {
- The Java Bean
- Using Java Packages
Relevant Chapters in the Table of Contents

| JavaBeans |

Mastering JavaBeans
by Laurence Vanhelsuwe     ISBN:0782120970
Sybex © 1997,795 pages
Learn to create customizable, reusable self-contained Java components and tailor those made by others.

Top Section Hits (of 6 in this book)
- Introduction
- An Overview of the Book
- Bean Property Categories
- Summary
Relevant Chapters in the Table of Contents Search relevance: medium

| Java2 Unleashed |

Java 2 Platform Unleashed
by Jamie Jaworski     ISBN:0672316315
Sams ©1999,1424 pages
For Java Programmers: an in-depth venture into Java 1.2 (which Sun calls the "Java 2 Platform").

Top Section Hits (of 7 in this book)
- Other New Capabilities
- Enhancements
- Core API
- Overview
Relevant Chapters in the Table of Contents

FIG. 11B books24x7.com
FEEDBACK

Search the Book Contents
Enter words or phrases that
might occur in the text. Tips java jar files ⊙ Search All Books  (Search)
○ Search only this Book Look Up Books You Know
Enter title words, author's
name, publisher's or ISBN
Tips (Lookup)

( List | Next ) (Create Comment) (Add to Bookshelf) (Purchase Book)
                                                    ╲₋172

Java 2    Mastering Java 2
          by John Zukowski           ISBN:0782121802
          Sybex © 1998, 1244 pages
          Do Java right with practical instruction and tips
          for everything from basic to advanced features.

▽ Table of Contents        ▽ Colleague Comments
▽ Back Cover               ▽ Public Comments Synopsis by Rebecca Rohan Mastering Java 2 starts by laying a strong foundation of basic
concepts, such as multithreading, in the beginning of the book,
then builds higher floors in even layers. In multithreading, for
example, there's more on thread synchronization, inter-thread
communications, thread priorities and scheduling, and daemon
threads toward the middle of the book. Nearer the end, the
authors focus on making multithreaded applets behave well.        ⎫
After gaining a layered and interlocking understanding of many    ⎬ 132
other topics in this 1200-page text, the reader will master much  ⎭
of Java 2. Along the way, there's practical advice for such
important tasks as minimizing applet loading time. Writing
server systems, working with cryptographic APIs,
communicating with RAS, and doling out authorization are
some of the many other topics explored in Mastering Java 2.

Top ↑

Table of Contents ⟋ 134

Search results indicator: ■ Higher Relevance ▨ Medium Relevance ☐ Lower
Relevance Mastering Java 2
Introduction Part I    Foundations of Java Chapter 1 -Introducing Java
 ■ Chapter 2 -Applets, Applications, and the Java
              Development Kit
   Chapter 3 -Working with Java Objects
   Chapter 4 -Datatypes, Modifiers, and Expressions
 ▨ Chapter 5 -Java Classes, Interfaces, and Packages
   Chapter 6 -Arrays and Flow-Control Statements
   Chapter 7 -Exception Handling
   Chapter 8 -Threads and Multithreading Part II   Applying Standard Java Classes Chapter 9  -Standard Java Packages
   Chapter 10 -Animation and Images
   Chapter 11 - 2D Graphics and Imaging
   Chapter 12 - GUI Layout Management
   Chapter 13 -Swing GUI Components
   Chapter 14 - Event Handling
   Chapter 15 -Advanced Swing Capabilities
   Chapter 16 - Transferring Data
   Chapter 17 -Java Collections
 ■ Chapter 18 -Advanced Applet Programming
   Chapter 19 -Streams and Input/Output Programming
   Chapter 20 -Network Programming

FIG. 11C

Part III Advanced Topics
Chapter 21 -Java Database Connectivity (JDBC)
▣ Chapter 22 -JavaBeans
Chapter 23 -Java Servlets
▣ Chapter 24 -Security
Chapter 25 -Remote Method Invocation
Chapter 26 -Java and CORBA Top ↟

Back Cover ╱ 136

Mastering Java 2 provides the most in-depth coverage of JDK 2, enabling you to take immediate advantage of the many new and improved features of the latest standard from Sun.

Inside, you'll find ample discussion of the basics, with everything that makes Java ideal for simple desktop and Internet applications. Experienced Java programmers will benefit most from the detailed coverage of what's new, including the many capabilities that make Java 2 ready for true enterprise development. Coverage includes:

.Building forms with the Swing component set
.Creating superior Java graphics with the 2D API
.Implementing drag-and-drop support
.Supporting advanced data structures with the Collections API
.Providing built-in security with the Java Cryptography Architecture
.Integrating your Java program with CORBA
.Enhancing server-side performance with servlets
.Building truly fast Java solutions About the Author John Zukowski is a software mage with MageLang Institute, a Java training firm. He is the author of Java AWT Reference, Borland JBuilder: No Experience Required, and the Focus on Java online guide, java.miningco.com, at The Mining Co.

Top ↟

Books24x7.com, Inc © 1999 - Feedback

FIG. 12

| Table Of Contents | Create Bookmark | Add To Bookshelf | Purchase Book |

174 points to Create Bookmark.

Chapter 18 - Advanced Applet Programming

Mastering Java 2
John Zukowski

Copyright © 1998 Sybex, Inc

Minimizing Applet Loading Times
As you can see, real and functional applets are not small. This means
that the more functionality you add, the longer your applet will take to
load over the Internet. As applets become more popular, more and
more Internet bandwidth is used up to transfer these competing applets
from their server machines to your client machine running your favorite
Web browser. This can mean only one thing: more bandwidth pressure
on the Internet and a resulting (further) slowing of response times.
Therefore, in this climate of scarce bandwidth, it is important to
minimize not only the amount of Internet resources your applet uses but
also the response times to maintain a swift, interactive feel. You can
achieve these goals in three ways:

– 137

- Minimize the size of the applet's executable.
- Minimize the number of classes used.
- Use Java Archive (JAR) files  ⟵ 138
- Minimize the applet's initialization time.

Keeping Executables Small
Large files take longer to travel over the Internet than shorter files, and
applets do not get any special treatment. If you have already looked at
the size of the * .class files your Java compiler generates, you should
be extremely impressed by their compactness. Compared to compiled
C or C++ code, these Java executables are positively minute. There are
two reasons for this:

- Java machine code is very compact.
- Every standard class imported by a Java program is not a physical
  part of the program.

Nevertheless, being able to shave off a number of bytes can mean the
difference between a ten-second load and a twelve-second load (and to
a user, waiting always feels like an eternity). This wide discrepancy is a
result of packet segmentation, a property of Internet file transfers. You
must have noticed the phenomenon when surfing the Web: The
progress indicator fills up burst by burst, and just before completing the
load, it indicates that it is stuck waiting for just a few dozen more bytes
to finish. It is at this stage that you wish your applet was a couple of
dozen bytes shorter.

The explanation for this frequent delay right at the end of a load has to
do with the segmentation of a transmitted file. Although the Internet (the
TCP protocol, to be correct) accepts data streams of arbitrary length,
the networking devices (routers, in particular) responsible for getting
this data from point A to point B usually have strict upper limits on the
size of packets that they can deal with. This limit is frequently 256, 512,
1,024, or 2,048 bytes. Therefore, when an applet is transmitted over the
network, it is segmented into N-1 packets of some fixed size plus one
last tail packet containing the remaining few bytes. All of these packets
travel independently and must be reassembled into the original applet
executable byte stream at the client's end. When the last packet is
unfortunate enough to be delayed, you can wait seconds for just a few
bytes more to complete the load. And that's annoying at best.

FIG. 18 books24x7.com
FEEDBACK

LOGIN STATUS

/— 184

Java 2

Mastering Java 2
by John Zukowski     ISBN:0782121802

Chapter 18 - Advanced Applet Programming
Minimizing Applet Loading Times

Bookmark Note: (Optional)          186

⦿ Private Bookmark

◯ Shared Bookmark
Select the colleagues with whom you wish to share the Bookmark. If no colleagues are selected, then all of them will be able see the bookmark.

☐ Send e-mail notification to selected colleagues.

188

Creating a bookmark adds the book to your bookshelf.

( Create Bookmark )

Books24x7.com, Inc © 1999 - Feedback

FIG. 19

SYSTEM AND METHOD FOR PROVIDING A SEARCHABLE LIBRARY OF ELECTRONIC DOCUMENTS TO A USER

CROSS-REFERENCE TO RELATED APPLICATIONS

This application is related to and claims the priority under 35 U.S.C. 119(e) of U.S. Provisional Patent Application Ser. No. 60/170,038 filed Dec. 10, 1999. That application is hereby incorporated herein by reference in its entirety.

BACKGROUND OF THE INVENTION

The invention relates generally to a system and method for providing a searchable library of electronic documents to a user and more specifically to a system and method for providing a searchable library of electronic books which can be accessed by a user over a global computer network such as the Internet.

Book publishers publish many books only in hard copy form. In many instances these hard copy books are not available to individuals until the books reach retail stores or are available for purchase through mail order or on-line services. In order for an individual to have access to the contents of the hard copy book, the individual must either go to a retail store and purchase the book or order the book and wait for the book to be delivered. In both instances the book is not immediately available to the individual upon the individual desiring the book. In certain instances this causes a problem for an individual who requires instant information at time of day when retail bookstores are not open for business.

In addition, in order for an individual to determine if a book in hard copy form contains desired information, the individual must read the back cover, a summary of the book or scan the table of contents. This is a time consuming process and the information desired by the individual may still be located in the book, even if it is not identified in the summary or in the table of contents. There is no automatic mechanism for searching for key words in the text of a hard copy book. Further, many books published on the same topic may contain different information which is valuable to the individual. In many instances it is prohibitively expensive for an individual to purchase all the relevant books, and new books are constantly being published.

What is desired then is a system and method for providing a searchable library of electronic documents which is accessible to an individual at any time. What is also desired is a system and method for publishing a hard copy document in an electronic form which may be searched by an individual. The present invention permits such functionality.

SUMMARY OF THE INVENTION

The invention relates to a system and method for providing a searchable library of electronic documents to a user. The electronic library system includes an electronic document database, a search module, a user database, a user verification module, a web site server, a communication network and at least one user computer. The electronic library system is used for providing a searchable library of electronic documents to a user. The library of electronic documents is made accessible to a user upon the user obtaining a subscription to the electronic document library service. In one embodiment, the user pays a monthly fee in order to access documents stored in the electronic document library. The electronic documents may be books, magazines, or any other document which is in electronic form. In one embodiment, the electronic books are technical and computer books. The electronic documents may be accessed by a user computer by accessing the electronic document library's web site through a communication network. In one embodiment the communication network is a global computer network such as the Internet.

The invention also relates to a method for searching the electronic document database. In one embodiment, the user enters a key word query to search for documents in the electronic document database. The search module searches the document database in response to the query entered by the user. In one embodiment, the search module retrieves all the documents which satisfy the requirements of the key word query. In another embodiment, the search module retrieves the documents which are most relevant to the user's request. In yet another embodiment, the search module expands the search parameters in order to locate relevant documents.

The invention further relates to a system and method for publishing a hard copy document in an electronic form which may be searched by a user. In one embodiment, the electronic library system includes electronic document conversion computers which convert documents from hard copy form into electronic form. In one such embodiment, the electronic document conversion computers convert documents which are in an electronic form used by publishers to print hard copy documents into a form for electronic publication. The electronic form of documents used by publishers may be files from layout programs such as PageMaker, QuarkExpress, FrameMaker, or any other publishing program.

The present invention has the advantage of providing a searchable library of electronic documents which is accessible to a user at any time of the day. The invention has the further advantage of providing a library containing a quantity of documents which the user may not otherwise have access to and which is searchable by a user through key word searches. The invention therefore allows a user to have access to information at anytime that information is required and provides the user with a convenient and time efficient method for searching for the documents which are the most relevant to the user's needs.

BRIEF DESCRIPTION OF THE DRAWINGS

The invention is pointed out with particularity in the appended claims. The above and further advantages of this invention may be better understood by referring to the following description taken in conjunction with the accompanying drawings, in which:

FIG. 4 is a pictorial view of an embodiment of a screen display which is presented to a user upon accessing the web site of the electronic document library;

FIG. 8 is a pictorial view of an embodiment of a search screen display;

FIG. 9 is a pictorial view of an embodiment of a sub-topic list screen display;

FIG. 10 is a pictorial view of an embodiment of a search results screen display;

FIG. 11A is a pictorial view of another embodiment of a search results screen display;

FIGS. 11B and 11C are a pictorial view of an embodiment of a screen displaying the contents of an electronic document;

FIG. 12 is a pictorial view of another embodiment of a screen displaying the contents of an electronic document;

FIG. 18 is a pictorial view of an embodiment of a screen display presented to a user to create a virtual bookmark;

FIG. 19 is a pictorial view of a screen display showing the manifest created by an embodiment of the tool for converting a publisher's file to an electronic document file.

Like reference characters in the respective drawn figures indicate corresponding parts.

DETAILED DESCRIPTION OF THE INVENTION

Figure 1:
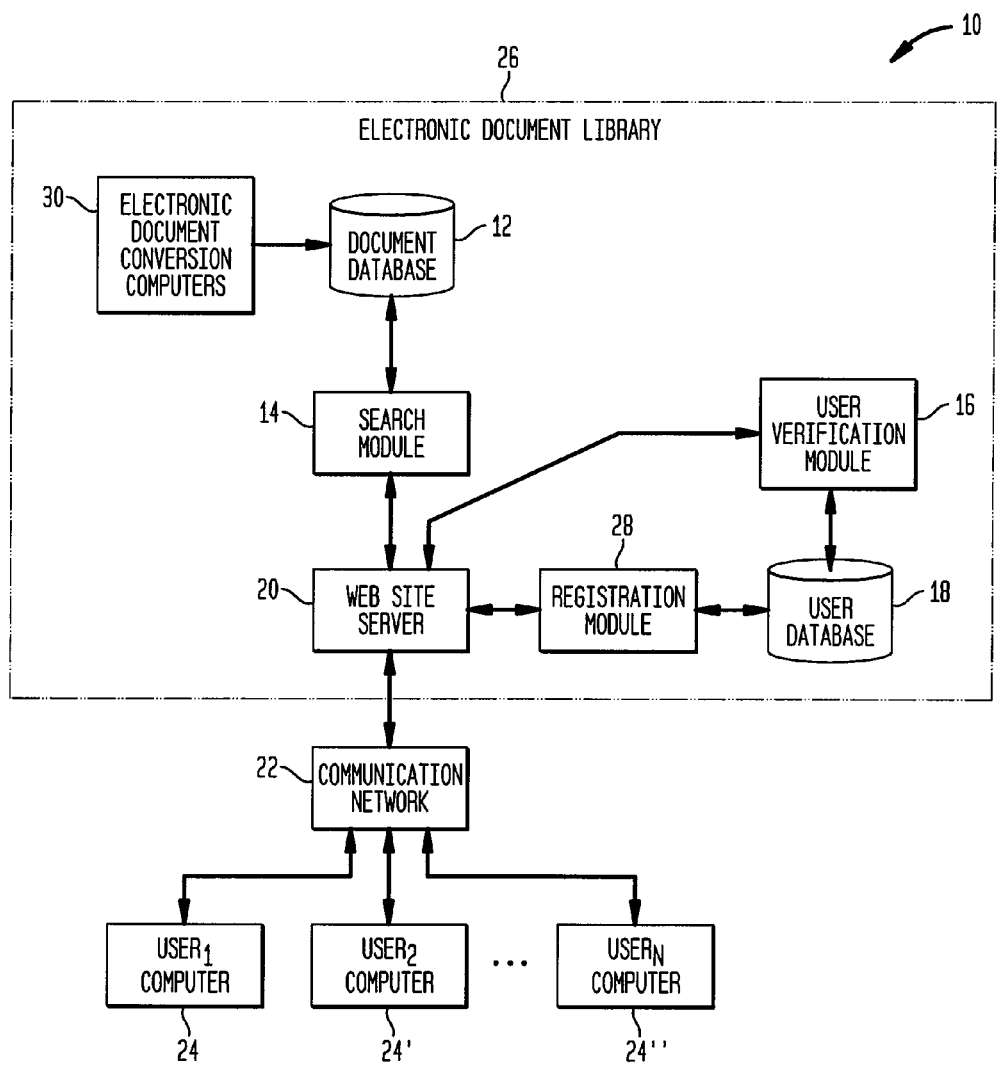
FIG. 1 is a schematic block diagram of an embodiment of an electronic document library system according to the invention.

In broad overview, and referring to FIG. 1, an embodiment of an electronic document library system 10 according to the present invention includes an electronic document database 12, a search module 14, a user database 16, a user verification module 18, a web site server 20, a communication network 22 and at least one user computer 24. The electronic document library system 10 is used for providing a searchable library of electronic documents to a user. The library of electronic documents 26 is made accessible to a user upon the user obtaining a subscription to the electronic document library service. In one embodiment, the user pays a monthly fee in order to access documents stored in the electronic document library 26. In another embodiment, the user pays a yearly fee in order to gain access. In yet other embodiments, the user pays a fee based on another predetermined period of time.

In one embodiment, the documents available in the document database 12 are documents which are commercially available from publishers. In one such embodiment, the electronic document library provider obtains the right to electronically publish the documents from the publisher. The electronic document library provider provides the publisher with compensation in return for the right to electronically publish the document. In one embodiment the compensation is a flat fee. In another embodiment, the compensation is a royalty-based fee. For example, the electronic document library provider may pay each publisher a percentage of the subscription fees obtained from users. The fee may be based on the number of documents the publisher provides. In another embodiment the fee paid to the publisher is based on the number of users who access the publisher's documents. In yet another embodiment, the fee paid to the publisher is based on the number of times the publisher's documents are accessed.

In still another embodiment, the electronic document library provider negotiates with each publisher the percentage of the electronic document library provider's revenue reserved for royalties. The electronic document library provider's royalty pool size is then a blended average of the negotiated rates with each publisher. The publisher then competes based on content usage (i.e., retrievals) for a piece of their view of the royalty pool. The usage calculation is weighted: page retrievals, placing a book on a bookshelf, and the list price of the book all factor into usage points for a publisher. The electronic document library provider then divides up the royalty pool as seen by each publisher by getting a percentage of their usage points versus total usage points for all publishers. The royalty payments are made quarterly.

The document database 12 provides a central location for storing the electronic documents that may be accessed by a user. The electronic documents may be books, magazines, or any other document which is in electronic form. In one embodiment, the electronic books are technical and computer books. The electronic documents may be accessed by a user computer 24 as described in more detail below. In one embodiment, the document database 12 is maintained by a third party at the electronic document library 26. The document database 12 may be a single database or may be a plurality of databases which are in communication with each other.

The document database 12 is in communication with the search module 14. The search module 14 searches the document database 12 in response to queries entered by a user computer 24. In one embodiment the search module 14 retrieves the documents which are most relevant to the user's request. An embodiment of a process for retrieving the most relevant documents will be described in more detail below in the description of FIGS. 14-16. The search module 14 is in communication with the web site server 20. The web site server 20 generates an interactive screen display for interacting with a user computer 24. The web site server 20 is connected to the communication network 22. In one embodiment, the communication network 22 is a global computer network, such as the Internet. In another embodiment, the communication network 22 is a telephone network. In yet another embodiment, the communication network 22 is an electronic network dedicated to the communication of information between the web site server 20 and the user computer 24. The communication network 22 may be any system for communicating data between two computers.

The user computer 24 may be any computer which is capable of being connected to the communication network 22. The user computer 24 may be the user's own personal computer or any other computer or terminal which the user may access to connect to the communication network 22. For example, the user computer 24 may be a computer which the user has access to at the user's workplace. In one embodiment, the user computer 24 is not a single computer, but changes as the user accesses different computers.

The user database 18 provides a central location for storing user information. In one embodiment, the user database 18 stores a user name and a password for each user authorized to access documents stored in the document database 12. In another embodiment, the user database 18 stores personal information regarding authorized users, such as name, address, telephone number, e-mail address, occupation, etc. In another embodiment, the user database 18 stores billing information for each user. For example, the user database 18 may store information indicating that the user's personal credit card account should be charged to keep the user's subscription current. Alternatively, the user database 18 may store information indicating that the user's employer should be charged to keep the user's subscription current. The user database 18 is in communication with a user verification module 16 which receives user information from the user computer 24 through the communication network 22 and the web site server 20. The user verification module 16 compares the user identification information received from the user computer 24 to the entries in the user database 18 and determines whether a user should be granted access to the document database 12.

In one embodiment, a user is allowed to search the document database 12 without being authorized by the user verification module 16. In this embodiment, the user is verified by the user verification module 16 upon requesting to view the contents of an electronic document. In another embodiment, the user is verified by the user verification module 16 before being able to search the document database 12. In yet another embodiment, the user is able to view only certain documents in the document database 12 without being verified by the user verification module 16.

In one embodiment, the electronic library system 10 includes a registration module 28. The registration module 28 enables users who are not currently included in the user database 18 to register for the service and to be added to the user database 18. In another embodiment, the user contacts the third party maintaining the electronic library system 10 in order to register for the service and be added to the user database 18. The registration process will be described in more detail below in the discussion of FIG. 7.

In another embodiment, the electronic library system 10 includes electronic document conversion computers 30 which convert documents from hard copy form into electronic form. In one such embodiment, the electronic document conversion computers 30 convert documents which are in an electronic form used by publishers to print hard copy documents into a form for electronic publication. The electronic form of documents used by publishers may be files from layout programs such as PageMaker, QuarkExpress, FrameMaker, or any other publishing program. The process for converting books into a standard electronic form will be described in more detail below.

Figure 2:
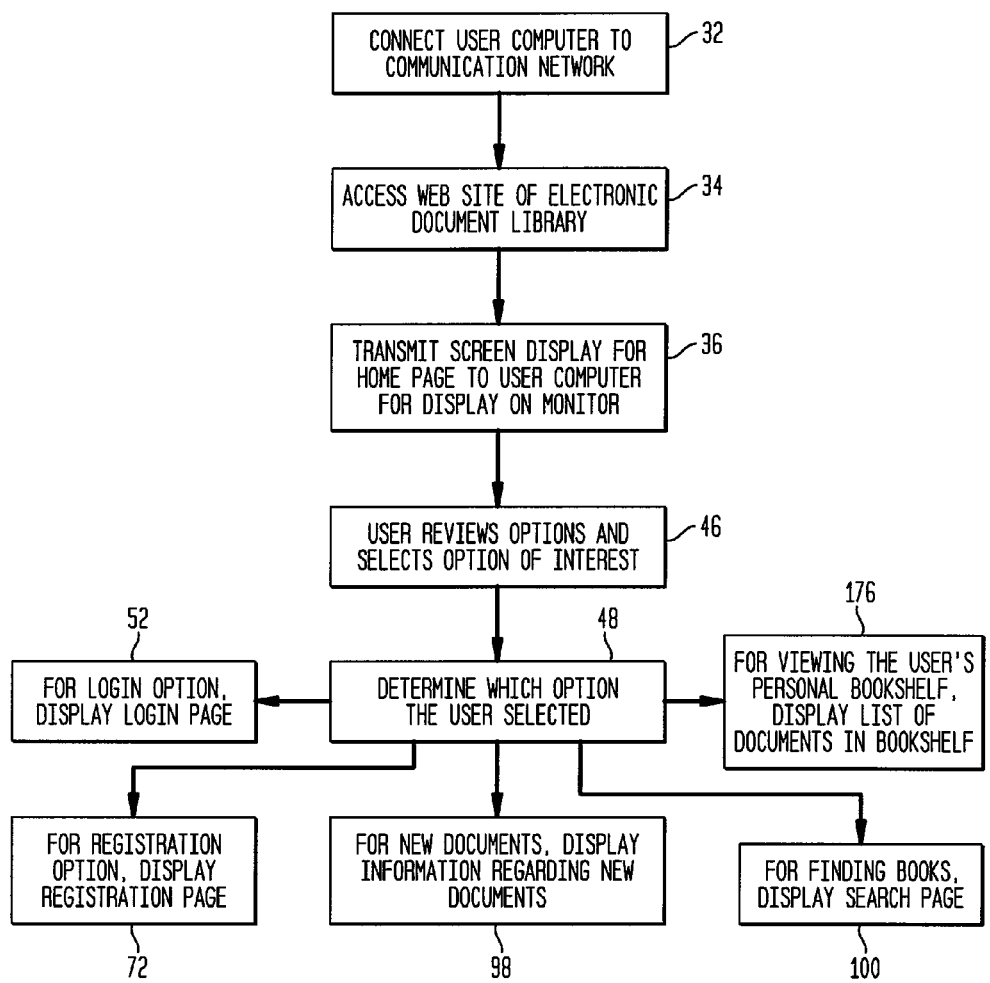
FIG. 2 is a flowchart illustrating the steps performed in an embodiment of the invention for a user to gain access to the documents stored in the electronic document library.

Referring to FIG. 2, a flowchart illustrates the series of steps performed for a user to gain access to the document database 12. At step 32, a user has access to a computer 24, such as a personal computer. The user connects the computer 24 to the communication network 22. In one embodiment, the user connects the computer 24 to a global computer network, such as the Internet, through a service provider. Next, in step 34 the user selects the web site address of the electronic document library 26. In step 36, in response to the user's selection, the web site server 20 transmits the screen display for the home page to the user computer 24 for display on the monitor of the user computer 24. The home page displays the main menu 37 from which the user may select.

Figure 3:
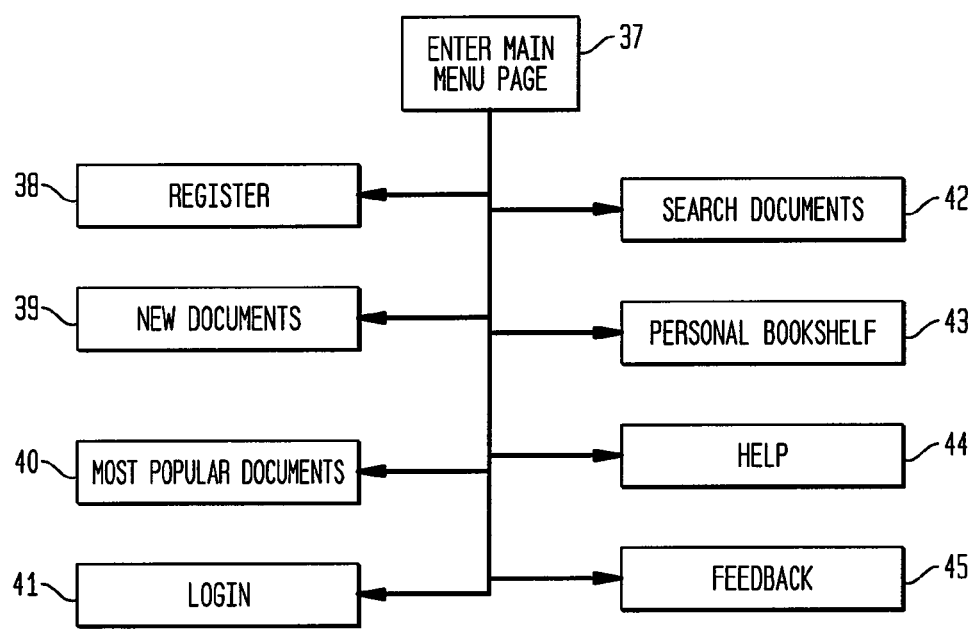
FIG. 3 is a diagram of the options available to a user through an embodiment of a main menu of the electronic document library system of the invention.

The main menu 37 provides the user with a central page from which all the major functions of the system 10 can be reached. The main menu screen presents the user with the different functions which may be selected by pointing and clicking on an appropriate button or icon. FIG. 3 illustrates the options from which a user may select upon entering the main menu page. The options include: register 38, new documents 39, most popular documents 40, login 41, search documents 42, personal bookshelf 43, help 44 and feedback 45. Each of these options will be described in detail below. FIG. 4 presents one embodiment of a screen display 50 which may be presented to a user as a home page or main menu page. Referring back to FIG. 2, in step 46, the user reviews the options and selects the option of interest. In response to the users selection, the web site server 20 determines which option the user selected in step 48 and selects the appropriate page to present to the user.

Figure 5:
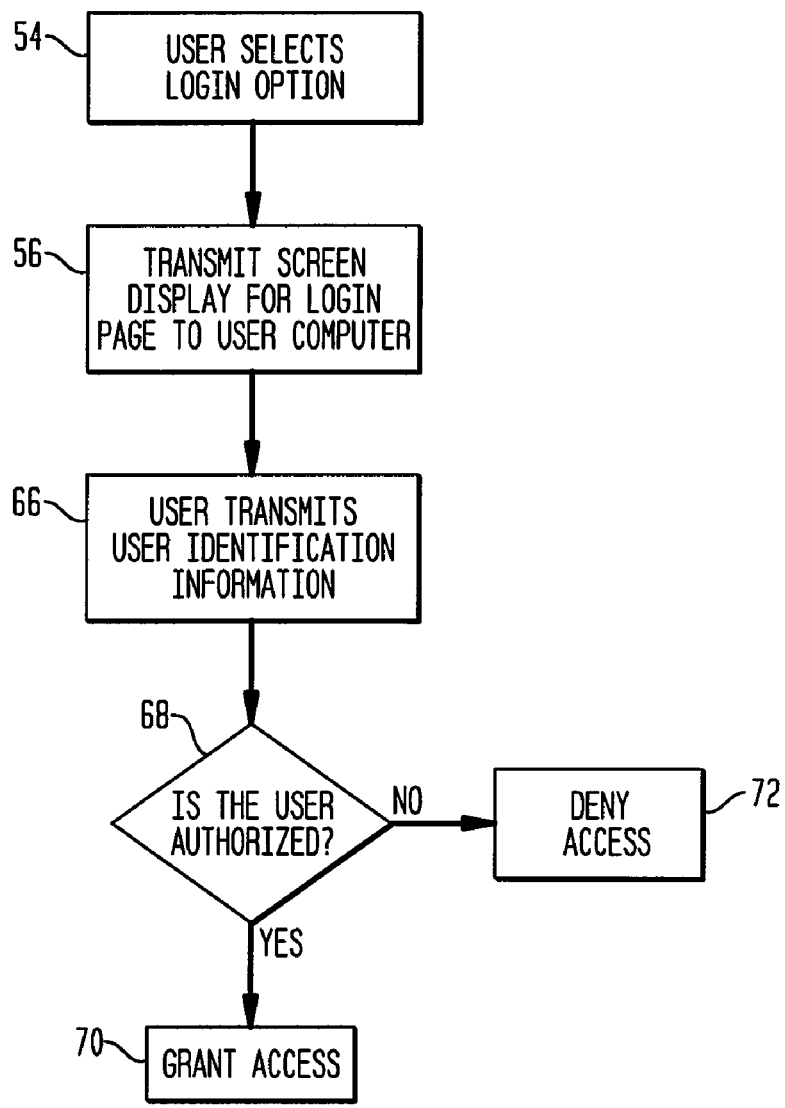
FIG. 5 is a flowchart illustrating the steps performed by a user to gain access to the documents in the electronic document library.
Figure 6:
FIG. 6 is a pictorial view of an embodiment of a login screen display.

If the user selects the login option 41, the web site server 20 proceeds to step 52 and displays a user login page. The flowchart of FIG. 5 illustrates the steps performed by one embodiment the present invention to login a user. As described above, in step 54 the user selects the login option 41. Next, in step 56, the web site server 20 transmits the screen display for the login page to the user computer 24. FIG. 6 is one embodiment of a login page screen display 58. The login page screen display 58 queries the user for a user name and a password. The login page screen display 58 includes a user name field 60 and a password field 62. Once the user has entered the user name and password into the login page screen display 58, the user selects the "Login" button 64 or hits a "Return/Enter" key. Upon selecting the "Login" button 64, the user computer 24 transmits the user identification information to the web site server 20 in step 66. Once the web site server 20 receives the user identification information entered into the login screen 58, in step 68, the web site server 20 transfers the user identification information to the user verification module 16. The user verification module 16 searches the user database 18 to determine if the user name is contained in the user database 18 and to determine if the entered password is valid.

If the user name and associated password are valid, the user verification module 16 grants the user access to the full contents of the documents in the electronic document database 12 in step 70. In one embodiment, if the user name is valid, but the associated password is invalid, the user verification module 16 sends an error message to the user computer 24 through the web site server 20 and requests the user to login again. If the user name is not valid, the user verification module 16 denies the user access to the electronic document database 12 in step 72. In another embodiment, the user is granted access to search the document database 12, but may not view the full contents of the electronic documents. In another embodiment, if the user is denied access in step 72, the user is given an opportunity to obtain a subscription to the electronic document library service by registering with the electronic document library 26. In one embodiment, the user may set the user's preferences to automatic login in order to avoid entering a user name and password each time the user accesses the web site server 20. In this embodiment, the user verification module 16 still verifies the user name and password, each time the user logs into the web site server 20 in order to verify that the user's subscription is still valid.

Figure 7:
FIG. 7 is a pictorial view of an embodiment of a registration screen display.

Referring again to FIG. 2, if the user selects the register option 38, the web site server 20 proceeds to step 72 and displays the registration page. FIG. 7 shows one embodiment of a registration screen 74. The registration screen 74 allows a user to request a subscription to the electronic document library 26. The registration screen 74 queries the user for user identification information, company information, telephone number information, e-mail address information and number of subscriptions requested. In another embodiment, the registration screen 74 also queries the user for billing information, such as a credit card number. The registration screen 74 includes user name fields 76, 78, a job title field 80, an e-mail address field 82, a telephone number field 84, a country field 86, a company name field 88, a department name field 90, a department size field 92 and a number of seats requested field 94. The number of seats requested field enables a user to purchase multiple subscriptions at the same time. For example, a company may wish to purchase subscriptions for several of its employees. In one embodiment, the country field 86 is a drop down menu from which a user may select a country. In another embodiment, the registration screen 74 also includes fields for the user's address and billing information, such as a credit card number and expiration date. In another embodiment, the registration screen 74, includes a field for the user to enter a preferred password. Once the user has entered all of the required information into the registration screen 74, the user selects the OK button 96 or hits the "Return/Enter" key.

After the user has entered the necessary information into the registration screen 74 and selected the OK button 96, the user computer 24 transmits the information to the web site server 20. The web site server 20 transfers the information to the registration module 28 which determines if the user should be granted a subscription. If the user is granted a subscription, the registration module 28 adds a user name and a password to the user database 18. In one embodiment, the registration module 28 uses the user name entered by the user in the user name fields 76, 78. In another embodiment the registration module 28 selects a user name for the user. In yet another embodiment, the registration module 28 uses the password entered by the user as a preferred password. In another embodiment, the registration module 28 selects a password to be associated with the user name. If the user is granted a registration, the registration module 28 contacts the user and informs the user of the user name and password to use when logging into the electronic document library 26. In one such embodiment, the registration module 28 sends an e-mail message to the user. The e-mail message contains the user name and password to be entered by the user when logging into the electronic document library 26. In another embodiment, the user is given the opportunity to change the user name and password.

Referring again to FIG. 2, if the user selects the new documents option 39, the web site server 20 proceeds to step 98 and displays information regarding documents recently added to the document database 12. If the user selects the most popular documents option 40, the web site server 20 displays information regarding documents which have been accessed by the greatest number of users or which have been accessed the greatest number of times during a predetermined period. In one embodiment, the predetermined period is the previous week.

Figure 8:
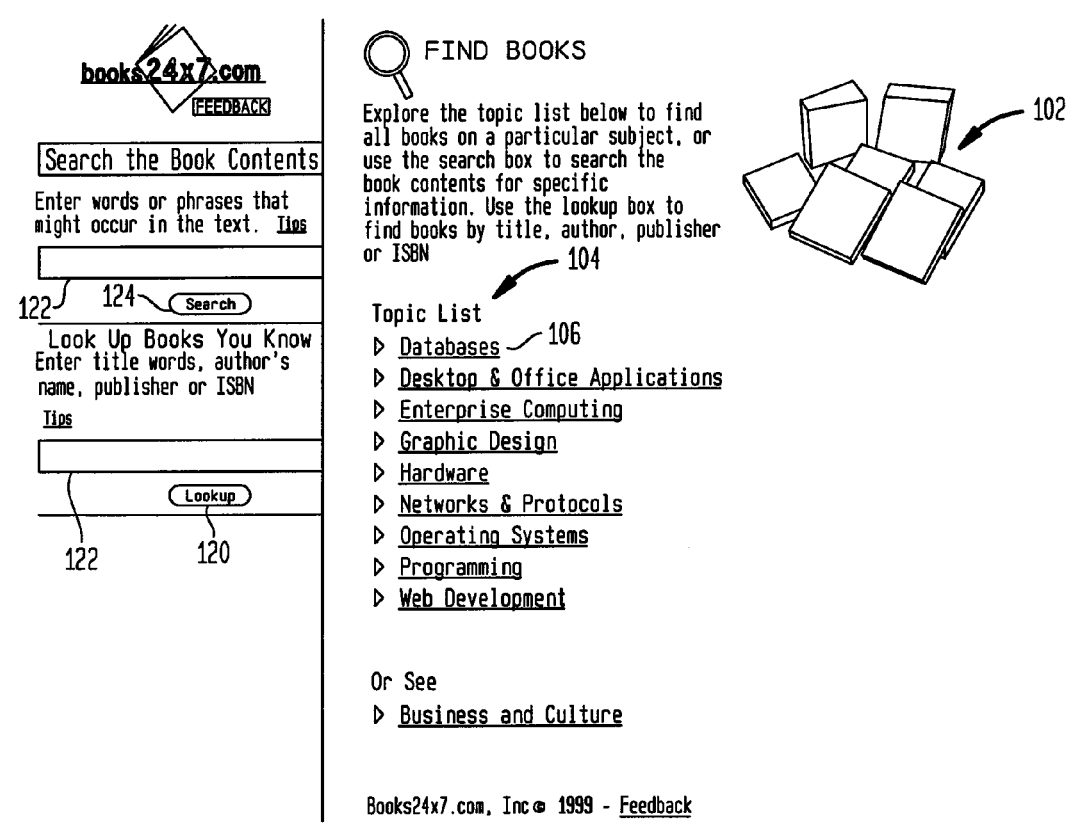

If the user selects the search documents option 42, the web site server 20 proceeds to step 100 and displays a find books page screen. FIG. 8 shows one embodiment of a find books page screen 102. In the embodiment shown in FIG. 8, the find books screen 102 presents the user with three options for searching the document database 12 for electronic documents. In one option, the user is able to browse a topic list 104. The topic list 104 of FIG. 8 identifies topics which may be of interest to information technology and computer specialists. Other embodiments of the topic list 104 may contain topics of interest to individuals in other fields. In one embodiment, once a user selects topic from the topic list 104, the user is presented with a list of sub-topics. For example, if a user selects the "Databases" topic 106, the user is presented with the sub-topic list 108 shown in FIG. 9. The user then has the option to return to the main topic list 110, select one of the sub-topics 108 or go to related topics 112.

Once the user selects one of the sub-topics 108, the search module 14 identifies the documents categorized under the selected sub-topic and the user is presented with a list of documents which are categorized under the selected sub-topic. For example, if the user selects the "Access" sub-topic 114, the user is presented with a list of documents in the form of the screen display 116 shown in FIG. 10. The user may then select one of the documents or return to the sub-topic list 108 or main topic list 104.

Referring again to FIG. 8, in another embodiment, the user is able to search for a particular document by supplying information regarding the particular document. For example, the user may search for a document by entering words in the document's title, the author's name, the publisher or the ISBN. The user enters the document information into the lookup field 118. Once the user enters the document information, the user selects the "Lookup" button 120 or hits the "Return/Enter" key. The search module 14 then searches the document database 12 for documents which correspond to the user's query and returns a list of the relevant documents.

In another embodiment, the user is able to search for an electronic document in the document database 12 by entering key words which might occur in the text of the document. The user enters the key words into the key word field 122. Once the user has entered the key words, the user selects the "Search" button 124 or hits the "Return/Enter" key. The search module 14 then searches the document database 12 for documents which contain the key words. In one embodiment, the user is able to instruct the search module 14 to search for documents in the entire document database 12, in a particular category from the main topic list 104 or sub-topic list 108, in a results list from a previous search or in books present in the user's personal bookshelf.

In the example shown in FIG. 11A, the user has entered the key words "java jar files" in the key word field 122. The user has also selected to search all documents. The search module 14 searched the document database 12 and found 21 documents. The search module 14 presents a list of the found documents to the user. In one embodiment, the search module 14 searches the document database 12 for the documents which contain information most relevant to the user's query. An embodiment of a method for determining which documents are most relevant will be described in detail below in the discussion of FIGS. 14-16. In one such embodiment, the search module presents the results of the search in order of relevance. In one embodiment, the search module 14 indicates the relevance of documents as "High", "Medium", or "Low". In still another embodiment, the search module 14 indicates the sections of the document which are most relevant. In yet another embodiment, the search module 14 presents the most relevant documents and links to the most relevant sections within these documents. In the embodiment shown in FIG. 11A, the search module 14 indicates the relevancy of different sections by using a thermometer type gauge 126. A thermometer gauge which the most filled has the highest relevancy. For example, in FIG. 11A, the section "Minimizing Applet Loading Times" 128 has a higher relevancy than the section "Using the Java Development Kit (JDK)" 130. In other embodiments, other types of level indicators are used to indicate relevancy.

From the search results list, the user may select to view an electronic document. For example, the user may select to view the book "Mastering Java 2" by clicking on the underlined title. The web site server 20 then displays the book to the user. In one embodiment, the web site server 20 displays the entire content of the book to the user, including text, graphics, tables, code listings, etc. In another embodiment, the web site server 20 displays the contents of the book just as the user would see the contents if viewing the hard copy version. Continuing the example from above and referring to FIGS. 11B and 11C, in one embodiment the web site server 20 displays a synopsis of the book 132, the table of contents of the book 134 and the information on the back cover of the book 136. In one embodiment, the web site server 20 also provides links to colleague comments about the book and public comments about the book. The web site server 20 also displays the thermometer gauges next to the most relevant sections of the book.

Referring back to FIG. 11A, the user may also select a link that leads directly to the relevant section of a document. For example, the user may select the link "Minimizing Applet Loading Times" 128 to go directly to that section of the document. FIG. 12 shows an example of a screen 137 which displays the content of the document section selected by the user. In one embodiment, the web site server highlights the key words 138 entered by the user.

Figure 13:
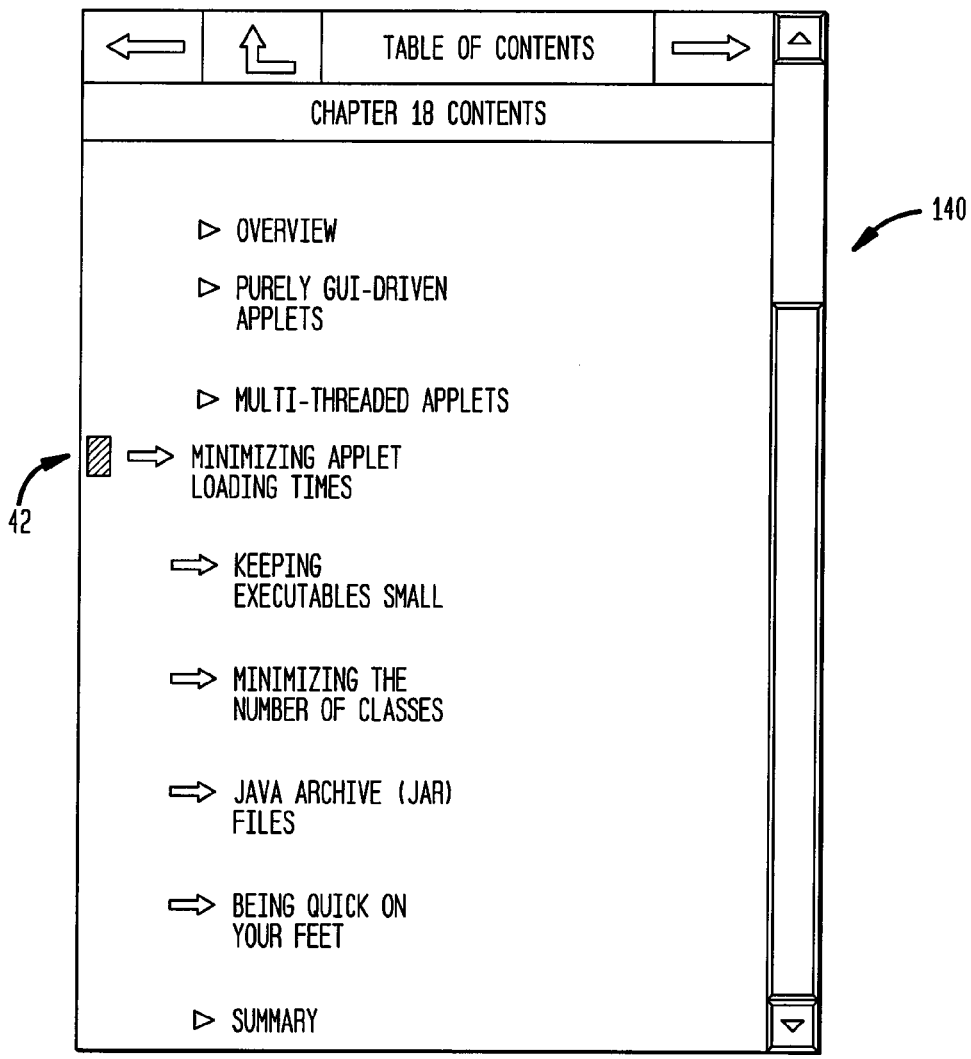
FIG. 13 is a pictorial view of an embodiment of menu presented to a user to navigate the contents of an electronic document.

FIG. 13 shows an embodiment of a menu 140 presented to the user along with the contents of the selected document. The menu 140 identifies the portion 142 of the document the user is viewing and presents the user with links to other portions of the document.

Figure 15:
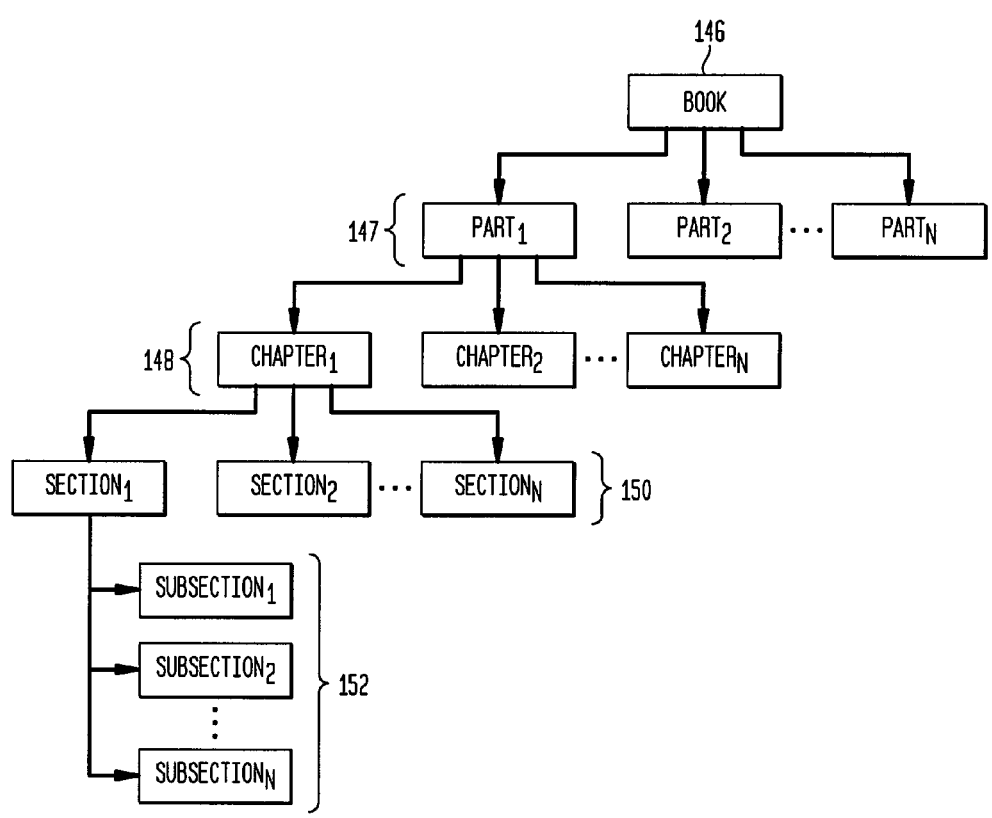
FIG. 15 is a block diagram illustrating the hierarchy of elements contained in typical hard copy books.
Figure 16:
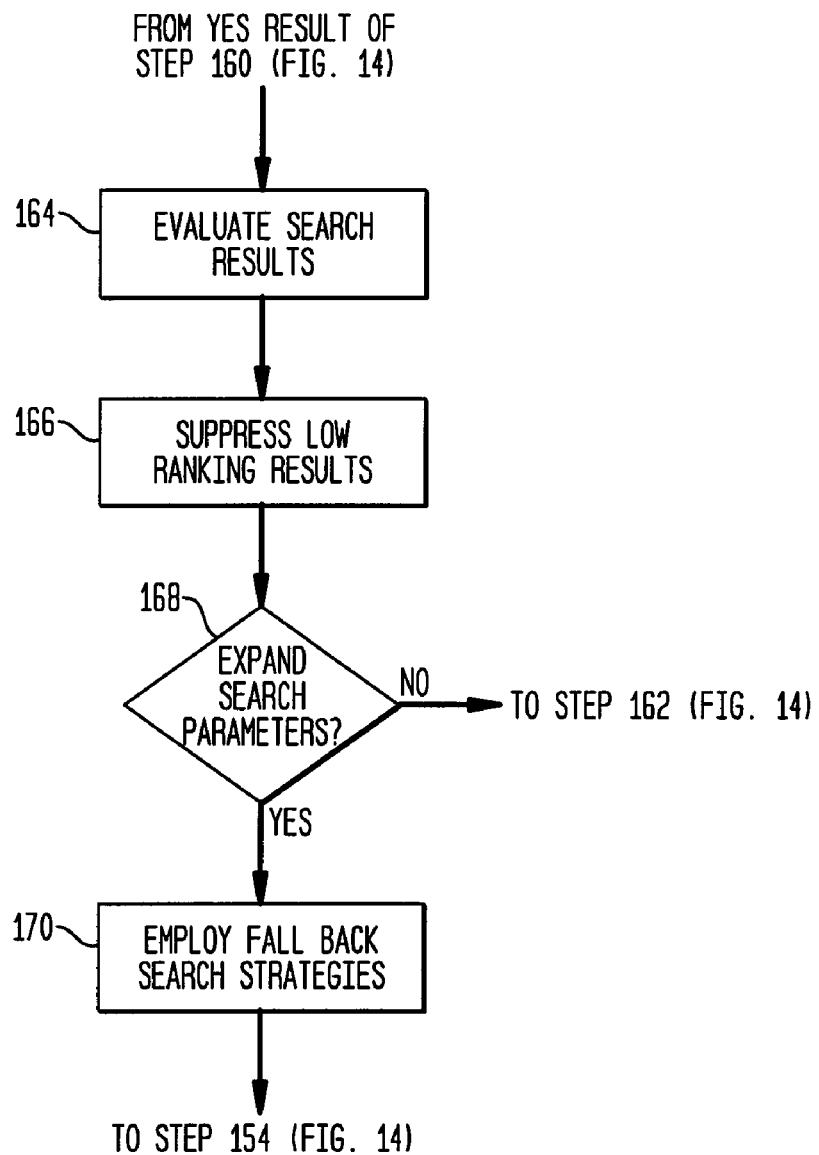
FIG. 16 is a flowchart illustrating the steps performed by the search module to improve the relevancy of the search results returned to a user.

In order to understand how this embodiment of a search is performed, it is important to understand how documents are stored in the document database 12. Knowledge of the typical structure of a type of document is used when documents are added to the document database 12. When the electronic documents are stored in the document database 12, the documents are broken down into a hierarchy of constituent elements. The constituent elements are linked together in a relational scheme so that the document database 12 can identify which documents a particular element is part of. An index is created for each document which identifies the constituent elements. FIG. 15 illustrates a possible hierarchy for breaking down a book 146 into its constituent parts. Many books are composed of parts 147, each part 147 being composed of chapters 148, each chapter 148 being composed of sections 150 and each section 150 being composed of sub-sections 152. The sub-sections may contain text, tables, graphics, code listings, etc. Other documents may be composed of other elements.

Figure 14:
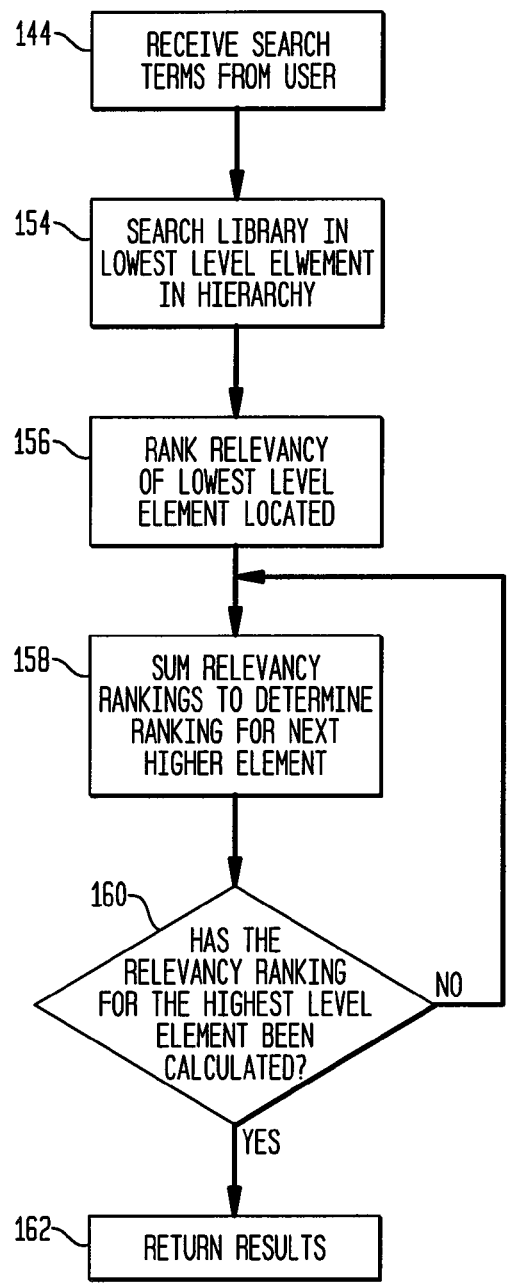
FIG. 14 is a flowchart illustrating the steps performed by the search module to return the most relevant documents in response to a user's query.

FIG. 14 shows a flowchart illustrating the steps performed by the search module 14 to locate the most relevant documents in the document database 12 in response to the key words entered by the user in the key word field 122. In step 144, the search module 14 receives the search terms from the user. In step 154 the search module 14 searches the lowest level elements of the documents. For example, if the document is a book 146, the search module 14 searches the subsections 152 for the key words entered by the user. Next, in step 156, the search module ranks the relevancy of the lowest level elements located. The search module may use any of the relevancy ranking algorithms known in the art to rank the relevancy of the lowest level elements located. All of the objects within the element are included in the calculation. For example, text, graphics, tables, code listings, etc. all searched and used in the calculation. In one embodiment, the search module 14 calculates the number of times a search term appears in the element. After the relevancy of the lowest level elements has been ranked, in step 158 the search module 14 sums the relevancy rankings of the lowest level elements to determine the ranking for the next higher element. For the book example shown in FIG. 15, the search module would rank the relevancy rankings for Part$_1$, and then sum the relevancy rankings for the parts 147 to determine a relevancy ranking subsections 152 to determine a relevancy ranking for Section$_1$. Next, in step 160, the search module 14 determines if the relevancy ranking for the highest level element has been calculated. For the book example of FIG. 15, the search module 14 determines if the relevancy ranking has been calculated for the book 146. If the relevancy ranking for the highest level element has not been calculated, the search module 14 returns to step 158 and repeats steps 158 and 160 until the relevancy ranking for the highest level element is calculated. Referring again to the book example of FIG. 15, the search module 14 would sum the relevancy rankings for sections 150 to determine a relevancy ranking for Chapter$_1$, and then sum the relevancy rankings for the chapters 148 to determine a relevancy ranking for the book 146. Once the relevancy ranking has been determined for the highest most elements, the search module 14 returns a list of the documents with the highest ratings to the user in step 162.

In one embodiment, the search module 14 assigns a relevancy ranking based on the number of hits and the quality of the hits (i.e. exact words in key word search). In another embodiment, the search module 14 assigns a relevancy ranking to a document according to how many times the document has been accessed. In another embodiment, the search module 14 assigns a relevancy ranking according to whether the user performing the search has accessed the document previously or has stored the document on the user's personal bookshelf.

In one embodiment, the search module 14 evaluates the search results before returning the results to the user. In one such embodiment, before returning the results to the user in step 162, the search module 14 performs the steps illustrated in the flowchart of FIG. 16. In step 164, the search module 14 evaluates the search results. In certain embodiments, to evaluate the search results, the search module 14 determines whether the exact key words entered by the user appeared in the located documents, the number of times the key words appeared in the documents, whether the key words appeared in the titles of the different elements of the document or simply within the text, and the number of elements within a document the key words appeared. Based on this evaluation, in step 166 the search module 14 suppresses low ranking results. In one embodiment, the search module 14 suppresses low ranking documents. In another embodiment, the search module 14 suppresses low ranking elements within a document. Next, in step 168, the search module 14 determines whether to expand the search parameters. The search module 14 may determine to expand the search parameters if none of the documents located had a high relevancy ranking or if the number of documents located was low.

If the search module 14 determines the search results are sufficient and the search parameters do not need to be expanded, the search module 14 returns to step 154 of FIG.

14 and returns the results to the user. If the search module 14 determines that the search results are not sufficient and the search parameters should be expanded, the search module 14 proceeds to step 170 and employs fallback strategies to expand the search results.

In determining whether to implement fallback strategies, the search module 14 must balance precision and recall. Precision refers to the accuracy of the documents located. If specific key words are important, to be precise the search results must contain those key words. Recall refers to the scope of the documents located. For example, by searching for only specific key words, a user may inadvertently omit documents which are relevant. Often users are not able to formulate a search which will return the most relevant documents. A user may not think to enter certain key words. The search module 14 balances precision and recall.

In one embodiment, the search module 14 begins by searching for highly precise results, e.g., results containing the exact key words in the exact manner entered by the user. If adequate results are not returned, the search module 14 works toward high recall. The search module 14 simulates the type of searching performed by information librarians. The strategies for expanding the search results may include stemming the key words entered by the user, implementing "near" operators, and implementing "and" and "or" operators. If the user has entered more than one key word, the search module 14 implements "near" operators by searching for the key words within a certain distance within from each other rather than searching for a phrase containing the key words directly next to each other. To implement the "and" operator, the search module 14 looks for both key words being in the document rather than being directly next to each other. To implement the "or" operator, the search module 14 searches for documents containing at least one of the key words entered by the user. In different embodiments the search module 14 employs different strategies for expanding the search and employs the strategies in different orders. The purpose of expanding the search is to provide the user with the optimum results.

Once the search module 14 determines a strategy for expanding the search parameters, the search module 14 returns to step 154 of FIG. 14 and repeats steps 154-168 until the search module 14 determines not to expand the search parameters. In one embodiment, when repeating step 156, the ranking assigned to a document element is dependent upon the search performed. For example, a document containing an exact phrase entered by a user receives a higher relevancy ranking than a document containing each word of the phrase in separate parts of the document.

In one embodiment, along with returning the search results, the search module 14 displays the actual search conducted to locate the search results. For example, if the user entered the key words "java jar files" and the search module 14 returned documents containing the words "java" or "jar" or "file", the search module would inform the user that the search conducted was: java or jar or file.

In addition to searching for documents, a user may create a personal virtual "bookshelf" of documents. The bookshelf contains documents that the user accesses frequently or desires to be able to access without searching the document database 12. Referring again to FIG. 11B, upon accessing an electronic document, a user is presented with the option of adding the document to the user's personal bookshelf through an "Add to Bookshelf" option 172. Upon selecting the "Add to Bookshelf" option 172, the document is added to the user's personal bookshelf. Referring to FIG. 12, when viewing a portion of a document, the user is presented with an option of creating a virtual bookmark to that portion.

Figure 17:
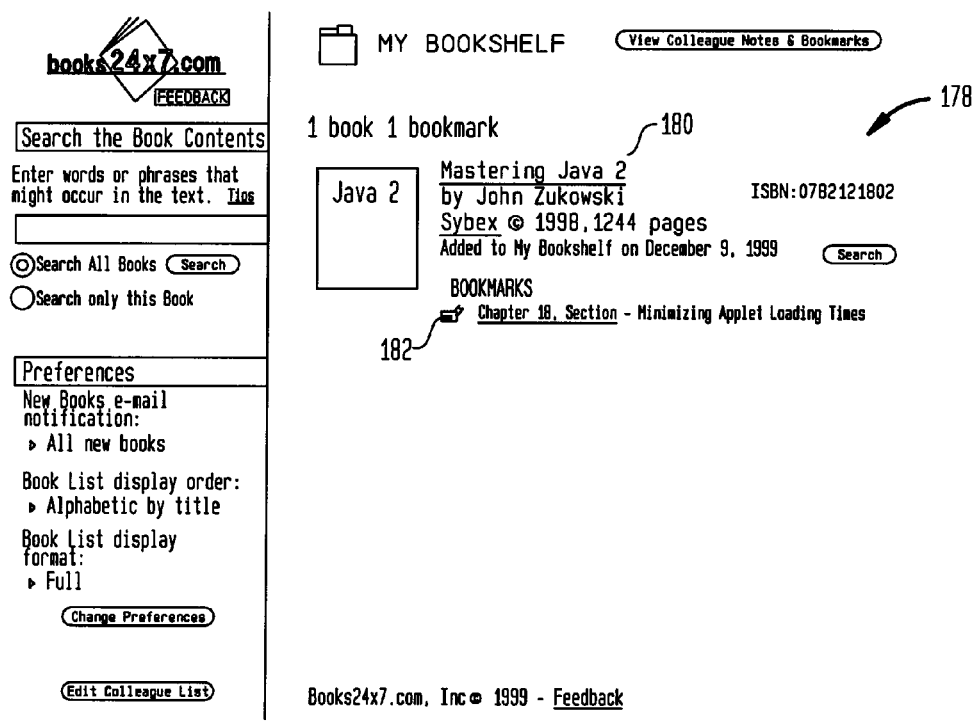
FIG. 17 is a pictorial view of an embodiment a virtual bookshelf.

When the user selects the personal bookshelf option 43 from the main menu, the web site server 20 displays a list of the documents in the user's personal bookshelf and a list of the bookmarks created by the user (step 176 in FIG. 2). FIG. 17 shows an example of a screen displaying a document 180 and a bookmark 182 stored on the user's bookshelf. In one embodiment, when the create bookmark option 174 is selected by the user, in addition to simply adding a bookmark to the user's bookshelf, the web site server 20 presents the user with a several options for personalizing the bookmark. FIG. 18 shows one embodiment of a screen display 184 for allowing a user to personalize a bookmark. The screen 184 includes a bookmark note field 186 into which the user may enter a comment about the document. In one embodiment, the screen 184 also allows the user to keep the bookmark private or share the bookmark with others. In another embodiment, the screen 186 allows a user to select an e-mail option 188. If the user selects the e-mail option 188, an e-mail notification is sent to the individuals identified by the user informing the individuals of the bookmark.

As mentioned above, in one embodiment, the electronic document library system 10 includes electronic document conversion computers 30 for creating digital versions of existing paper-based books which are aggregated, categorized and added to the document database 12. Many hard copy book publishers used different desktop publishing software programs to produce books. Examples of different programs include PageMaker, QuarkExpress, FrameMaker and others. These publishing programs enable books to be published as hard copy books by printing presses. These files are not in a form capable of electronically publishing the documents. The electronic document conversion computers 30 execute an algorithm which converts files from different desktop publishing programs into a standard electronic format.

Attachment 1 is a user guide which describes the process for creating an electronic book from a file obtained from a publisher. The user guide describes the steps a user, such as a person who is converting an electronic book file from a publisher's press-ready or pre-publication digital data format to a searchable electronic library format of the present invention, performs, using an embodiment of a document conversion tool to create an electronic book.

Figure 19:
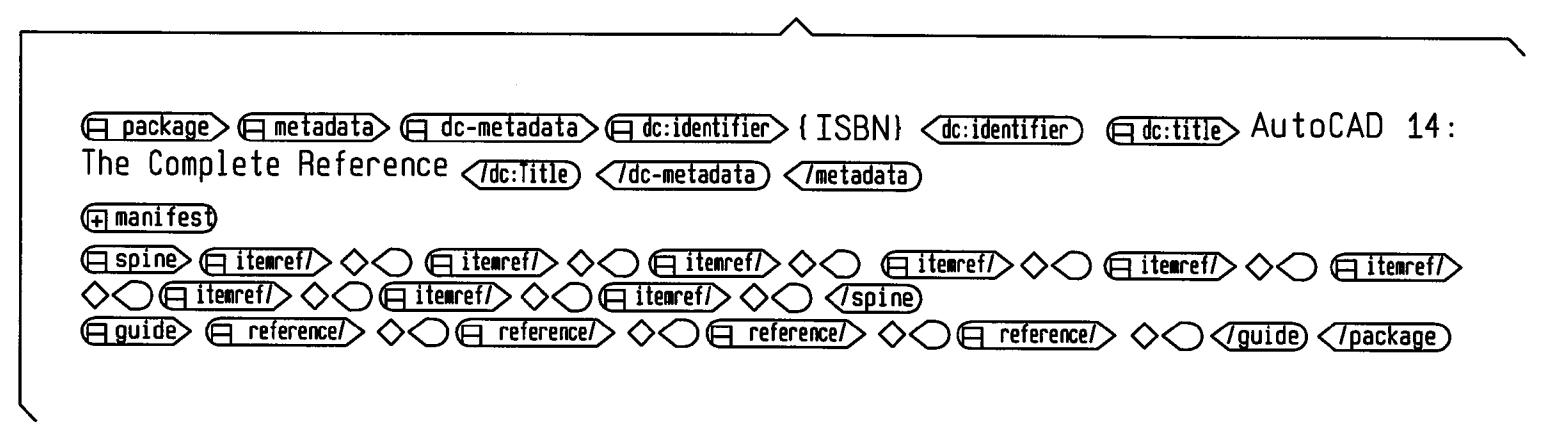

FIG. 19 shows a screen display illustrating the manifest created by an embodiment of the tool for converting a publisher's file to an electronic document file. The manifest lists all of the files composing the document.

Figure 20:
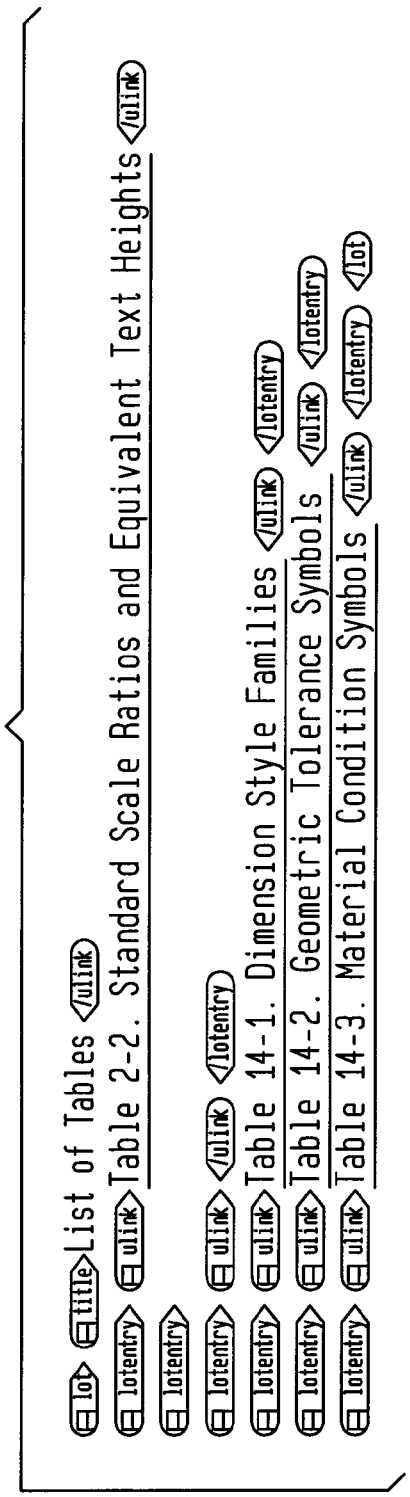
FIG. 20 is pictorial view of a screen display showing the list of tables created by an embodiment of the tool for converting a publisher's file to an electronic document file.

FIG. 20 shows a screen display illustrating the list of tables included in a book created by an embodiment of the tool for converting a publisher's file to an electronic document file.

Thus it will be seen that the present invention provides a method and system for publishing a plurality of books for user access to information. The system includes selecting a plurality of books, converting each book from a layout or publication digital data form, e.g., by training a tool to detect characteristic features (such as layout, typeface, and hierarchical or organizational features such as chapter headings, captions, drawings and tables), and extracting text or data information of the book tagged with the features. This produces a searchable publishing database, e.g., arranged as an xml database indexed by book structure such that a user may remotely, e.g., over the internet or other network, access the database, search desired text data, and view an image of a portion of the book with the desired data. The system includes a user registration module to identify an authorized user, and may maintain a personal bookshelf for the user. Advantageously, a search engine may rank search results based on their position in the hierarchy or other factors, determining degree of relevance of text or data information located by the search engine. The other factors may include position of located search data in the hierarchy, identification of search data in the user's personal library, identification of search data in a prior search by the user or degree of match of data identified in the search.

The search engine may be a commercially available search engine together with an interface that operates, when provided a search query by a user, to search for an exact match and to score hits for relevance, and in the event an exact match is not found, operate to expand the query and return scored search results located by the search engine together with an indication of the expanded search such that the user may ascertain a degree of likely relevance of returned text or data information. The relational database may include hyperlinks to related section heading data, such that a user accessing a page of a book may immediately view related data and context of a page. The relational database is indexed by logical subunits of the book, so searches for boolean combinations or proximity of elements span page breaks of book text to identify all instances of the desired search data. The search engine may employ a graded or adaptive search strategy, and may expand a search if all hits have low ranking, and suppress hits of low ranking when the search produces hits of high ranking. In further embodiments, the search engine may be adapted to inspect the content of tables, formulae and drawings of the converted book files to further enhance utility of the system as a technical book library. This may be done, for example, by parsing data structures in appearing in a programming language, such as C that define the tables, formulae or drawings.

Attachment 2 is an example of a chapter of a book that has been converted to electronic form using the program described in the user guide of Attachment 1. Attachment 2 shows examples of the different tags applied by the program to identify different elements of the book.

One skilled in the art will appreciate further features and advantages of the invention based on the above-described embodiments. Accordingly, the invention is not to be limited by what has been particularly shown and described. All publications and references cited herein are expressly incorporated herein by reference in their entirety.

The invention claimed is:

1. A method of publishing a plurality of books for user access to information, the method comprising the steps of
   selecting a plurality of books, each book being in a layout form for hardcopy publication and not an electronic publishing format;
   providing a tool to detect characteristic features of the books, wherein the features include hierarchy features of the books;
   applying the tool to detect the hierarchical features of the books;
   applying the tool to extract text or data information of the books and to tag the extracted text or data information of the books with the hierarchical features;
   storing said tagged text or data information from the plurality of books in a publishing database; and
   arranging said publishing database as a searchable database configured for a user to remotely:
   access the database over a network or internet;
   search the text or data information for desired data; and
   view an image of a portion of the book with the desired data
   wherein the database is a relational database having said text or data information organized and related as chapter, section, subsection or other hierarchy, and wherein the step of arranging said database as a searchable database includes
   providing a search engine that scores search results based on their position in the hierarchy to determine their degree of relevance of text or data information located by the search engine.

2. The method of claim 1, wherein the step of arranging said database as a searchable database includes arranging a user registration database to identify an authorized user.

3. The method of claim 2, further comprising the step of providing, for an authorized user, a collection of books constituting a personal bookshelf.

4. The method of claim 1, wherein the database is a relational database having said text or data information organized and related as chapter, section, subsection or other hierarchy, and wherein the step of arranging said database as a searchable database includes
   providing a search engine that scores search results based upon at least one factor selected from the set of factors including position of located search data in the hierarchy, identification of search data in the user's personal library, identification of search data in a prior search by the user, degree of match of data identified in the search.

5. The method of claim 1, wherein the step of arranging said database as a searchable database includes
   providing an interface with a search engine effective, when provided a search query by a user, to search for an exact match and to score search result for relevance, and in the event an exact match is not found, operating to expand the query and return scored search results located by the search engine together with an indication of the expanded search such that the user may ascertain a degree of likely relevance of returned text or data information.

6. The method of claim 1, wherein the tool detects characteristic features of a book including format of section headings, layout of text, drawings and captions and organizational features of the book.

7. The method of claim 1, wherein the step of arranging said database as a searchable database includes storing said database as a relational database including hyperlinks to related section heading data, such that a user accessing a page of a book may immediately view related data or context of a page.

8. The method of claim 1, wherein the step of arranging said database as a searchable database includes storing said database as a relational database indexed by logical subunits of the book such that expanded searches for boolean combinations or proximity of elements span page breaks of book text to identify all instances of the desired search data.

9. A method of publishing a plurality of books for user access to information, the method comprising the steps of
   selecting a plurality of books, each book being in a layout form for hardcopy publication and not an electronic publishing format;
   detecting characteristic features of the books, wherein the features include hierarchical features of the books;
   extracting text or data information of the books and tagging the extracted text or data information with the hierarchical features;

providing a publishing database of said plurality of books wherein the text or data information of the books is arranged in a relational database reflecting the hierarchical features of the books;

arranging said publishing database as a searchable database configured for a user to remotely search and access the plurality of books over a network or internet with a search engine that searches the text or data information of the publishing database;

returning search results with images of corresponding portions of books having the desired data wherein the database is a relational database has said text or data information organized and related as chapter, section, subsection or other hierarchy, and wherein the step of arranging said database as a searchable database includes providing links to headings of the hierarchy and wherein said search engine ranks search results in accordance with one or more factors selected from among position of hits in the hierarchy, number of hits in a level, quality of hits, frequency of access and type of search to determine degree of relevance of text or data information located in a search.

10. The method of claim 9, wherein the search engine expands a search in the event search results have low ranking, and suppresses hits of low ranking when a search produces hits of high ranking.

11. A publishing system operative on a plurality of books, each book being in a layout form for hardcopy publication and not an electronic publishing format, wherein the system comprises
 a means for detecting characteristic features of the books, wherein the features include hierarchical features of the books;
 a means for extracting text or data information of the books and for tagging the extracted text or data information of the books with the hierarchical features detected by the means for detecting;
 a means for storing tagged text of data information from the means for extracting in a publishing database comprising:
  a searchable database of said plurality of books configured for a user to remotely access the database over a network or internet, and
  a search engine effective to search said publishing database for specified search data, and return an image of a portion of the book with the desired data wherein the searchable database is a relational database having said text or data information organized and related as chapter, section, subsection or other hierarchy, and wherein the search engine ranks search results based on their position in the hierarchy to determine their degree of relevance of text or data information located by the search engine.

12. The publishing system of claim 11, further comprising a user registration module for identifying an authorized user.

13. The publishing system of claim 12, further comprising, for an authorized user, a collection of books constituting a personal bookshelf.

14. The publishing system of claim 11, wherein the publishing database is a relational database having text or data information organized and related as chapter, section, subsection or other hierarchy, and the search engine scores search results based upon at least one factor selected from the set of factors including position of located search data in the hierarchy, identification of search data in a user's personal library, identification of search data in a prior search by the user, and quality of match of data identified in the search.

15. The publishing system of claim 11, wherein the search engine is configured such that given a search query by a user, the engine searches for an exact match and scores hits for relevance, and in the event an exact match is not found, operates to expand the search query and return ranked hits of the expanded search query together with an indication of the expanded search such that the user may ascertain a degree of likely relevance of returned text or data information.

16. The publishing system of claim 11, wherein the publishing database is stored as a relational database including hyperlinks to related section heading data, such that a user accessing a page of a book may immediately view related data or context of a page.

17. The publishing system of claim 11, wherein database is stored as a relational database indexed by logical subunits of the book such that expanded searches for boolean combinations or proximity of elements span page breaks of book text to identify all instances of the desired search data.

* * * * *